(12) United States Patent
Byrne et al.

(10) Patent No.: US 7,665,033 B2
(45) Date of Patent: Feb. 16, 2010

(54) USING A ZOOMING EFFECT TO PROVIDE ADDITIONAL DISPLAY SPACE FOR MANAGING APPLICATIONS

(75) Inventors: Paul Byrne, Los Altos, CA (US); Hideya Kawahara, Mountain View, CA (US); Frank E. Ludolph, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 335 days.

(21) Appl. No.: 11/514,551

(22) Filed: Aug. 31, 2006

(65) Prior Publication Data

US 2008/0059893 A1 Mar. 6, 2008

(51) Int. Cl.
*G06F 3/048* (2006.01)
(52) U.S. Cl. .................................. 715/782; 715/778
(58) Field of Classification Search ................. 715/782, 715/778
See application file for complete search history.

(56) References Cited

U.S. PATENT DOCUMENTS

| | | | |
|---|---|---|---|
| 5,305,435 A * | 4/1994 | Bronson ...................... 715/777 |
| 5,671,381 A * | 9/1997 | Strasnick et al. ............ 715/848 |
| 5,841,435 A * | 11/1998 | Dauerer et al. .............. 715/775 |
| 5,880,733 A * | 3/1999 | Horvitz et al. .............. 715/850 |
| 6,016,145 A * | 1/2000 | Horvitz et al. .............. 715/788 |
| 6,088,032 A * | 7/2000 | Mackinlay .................. 715/848 |
| 6,229,542 B1 * | 5/2001 | Miller ......................... 715/782 |
| 6,239,798 B1 * | 5/2001 | Ludolph et al. ............. 715/788 |
| 6,253,218 B1 * | 6/2001 | Aoki et al. .................. 715/201 |
| 6,577,330 B1 * | 6/2003 | Tsuda et al. ................ 715/782 |
| 6,613,100 B2 * | 9/2003 | Miller ......................... 715/273 |
| 6,966,036 B2 * | 11/2005 | Nason et al. ................ 715/778 |
| 7,010,755 B2 * | 3/2006 | Anderson et al. ........... 715/778 |
| 7,091,984 B1 * | 8/2006 | Clark .......................... 345/587 |
| 7,103,841 B2 * | 9/2006 | Ronkainen et al. .......... 715/727 |
| 7,178,111 B2 * | 2/2007 | Glein et al. ................. 715/848 |
| 7,240,291 B2 * | 7/2007 | Card et al. .................. 715/776 |
| 7,249,327 B2 * | 7/2007 | Nelson et al. ............... 715/782 |
| 7,340,682 B2 * | 3/2008 | Nason et al. ................ 715/746 |

(Continued)

OTHER PUBLICATIONS

Paul McFedries, Complete Idiot's Guide to Windows XP, Pub Date: Oct. 3, 2001, Alpha Books, Chapter 24: Changing the Desktop Background, pp. 1-6 and Chapter 24: Changing the Screen Area and Color Depth, pp. 1-3.*

(Continued)

*Primary Examiner*—William L Bashore
*Assistant Examiner*—David Phantana-angkool
(74) *Attorney, Agent, or Firm*—Park, Vaughan & Fleming LLP; Mark Spiller

(57) ABSTRACT

One embodiment of the present invention provides a system that uses a zooming effect to provide additional display space to manage applications. In one mode of operation, the system presents an image of a computer desktop to the user on a display device. When the system receives a request from a user to provide additional display space in a display device for application management purposes, the system decreases the size of the computer desktop in the display device to provide an extended display area. The system then facilitates application management by displaying items useful for application management in this extended display area. By providing the extended display area, the system allows the user to access such items easily and efficiently without losing the context of the computer desktop.

19 Claims, 7 Drawing Sheets

U.S. PATENT DOCUMENTS

| | | | |
|---|---|---|---|
| 7,350,154 B2 * | 3/2008 | Anderson et al. | 715/778 |
| 2003/0179240 A1 * | 9/2003 | Gest | 345/779 |
| 2008/0307362 A1 * | 12/2008 | Chaudhri et al. | 715/835 |
| 2009/0089710 A1 * | 4/2009 | Wood et al. | 715/835 |

OTHER PUBLICATIONS

NASCAR Arcade Player Reviews [online, retrieved on Aug. 15, 2006 from http://www.gamefaqs.com/coinop/arcade/review/R12257.html].

The TaskGallery Project:Navigation [online, retrieved on Aug. 15, 2006 from http://research.microsoft.com/adapt/TaskGallery/pages/navigation.htm].

David A. Smith, Alan Kay, Andreas Raab, and David P. Reed, "Croquet —A Collaboration System Architecture", *First Conference on Creating, Connecting, and Collaborating through Computing*, p. 2, 2003.

Linux Desktop: Virtual desktops, by Joe Bolin [online, retrieved on Aug. 4, 2006, from http://www.linux.com/article.pl?sid=04/08/11/2119247].

\* cited by examiner

USING A ZOOMING EFFECT TO PROVIDE ADDITIONAL DISPLAY SPACE FOR MANAGING APPLICATIONS

BACKGROUND

1. Field of the Invention

The present invention relates to user-interfaces for computer systems. More specifically, the present invention relates to a system that uses a zooming effect to provide additional display space for managing applications.

2. Related Art

Advances in communications and computing technology have led to dramatic changes in the way and the frequency with which people access information, and have led to an expectation that data should be accessible anywhere and at any time via a wide variety of devices. As a result, devices such as portable computers, as well as mobile phones, PDAs (Personal Digital Assistants), and car navigation systems, have grown to become increasingly sophisticated. While such devices have previously supported only a limited number of applications executing serially, they have evolved to accommodate a larger number of applications, with multiple applications running concurrently.

Most applications typically include user-interface (UI) elements which are displayed on the screen of a device, such as a launch icon to start an application, a text field or a thumbnail that represents a running application, or the main visual UI of the running application (e.g., a display window). Because device screen sizes are usually limited, users desiring to select from a large number of applications and to run multiple applications simultaneously on a single device need an efficient way to manage the multiple applications. However, existing UI approaches typically obscure large portions of the display, or do not provide a rich enough set of functionality. Attempts to address such issues in turn often require significant input to browse through selections. Furthermore, existing approaches do not support actions that act on every item in a set of task-related applications.

Hence, what is needed is a method and an apparatus that remedies the above-described user-interface problems for devices.

SUMMARY

One embodiment of the present invention provides a system that uses a zooming effect to provide additional display space to manage applications. In one mode of operation, the system presents an image of a computer desktop to the user on a display device. When the system receives a request from a user to provide additional display space in a display device for application management purposes, the system decreases the size of the computer desktop in the display device to provide an extended display area. The system then facilitates application management by displaying items useful for application management in this extended display area. By providing the extended display area, the system allows the user to access such items easily and efficiently without losing the context of the computer desktop.

In a variation on this embodiment, the system displays the extended display area in proximity to the edge of the screen and uses a transition animation as part of the zooming effect.

In a further variation, the system decreases the size of the computer desktop and displays the transition to a display with an extended display area using a three-dimensional view change and/or a simulated three-dimensional view change that maintains the spatial sense of the user.

In a further variation, the system, by using a three-dimensional view change and providing the extended display area in proximity to the edge of the screen, allows the user to continue interacting with items displayed in the computer desktop.

In a further variation, the system uses the extended display area and the computer desktop to facilitate displaying a metaphor of a work area with the top of a desk and a wall that hold items, along with a work space that displays active applications and other items.

In a variation on this embodiment, an item displayed in the extended display area can include:

a representation of a currently-running application;

an iconized view of an application;

a shortcut used to launch an application;

a file;

a folder;

a document;

a user interface element of an application that involves multiple user interface elements;

an iconized user interface element of an application that involves multiple user interface elements;

a file and/or application menu;

a user-defined grouping of regularly-used or functionally-similar applications or files; or a user interface element that controls the configuration, status, and/or parameters of software entities and/or computing devices, such as applications, windowing systems, operating systems, and/or connected devices and computers.

In a further variation, the control includes a graphical control used to control the display size of the computer desktop.

In a variation on this embodiment, the system provides the user with a choice of different sizes for the extended display area, and receives from the user a selection that corresponds to a desired size for the extended display area.

In a variation on this embodiment, the system receives a simple stimulus, such as a key combination or a mouse gesture, that indicates a user request to switch among a set of predefined degrees of zooming. For instance, predefined degrees of zooming can include a full-screen view of the computer desktop as well as narrow, medium-sized, and/or large views of the extended display area.

In a variation on this embodiment, the system displays an item in the extended display area distinctly and separately from the computer desktop, so that objects displayed on the computer desktop cannot obscure the extended display area.

In a further variation, the system divides the extended display area into sub-areas, wherein each of these sub-areas can provide different modal properties or behavior.

In a further variation, the system displays items in a sub-area of the extended display area using identifying characteristics, including tags, colors, borders, and textures. The system allows users to customize both which items are placed in a sub-area as well as the identifying characteristics of the items in the sub-area.

In a further variation, the system displays a set of commonly-used items in a small extended display area. Alternatively, when a user selects a larger extended display area, the system displays a larger set of items that includes both commonly-used items and less-commonly-used items.

In a variation on this embodiment, the system decreases the size of the computer desktop by either changing a three-dimensional model or camera view of the computer desktop or by interpolating the pixels of the computer desktop.

DETAILED DESCRIPTION

Figure 1A:
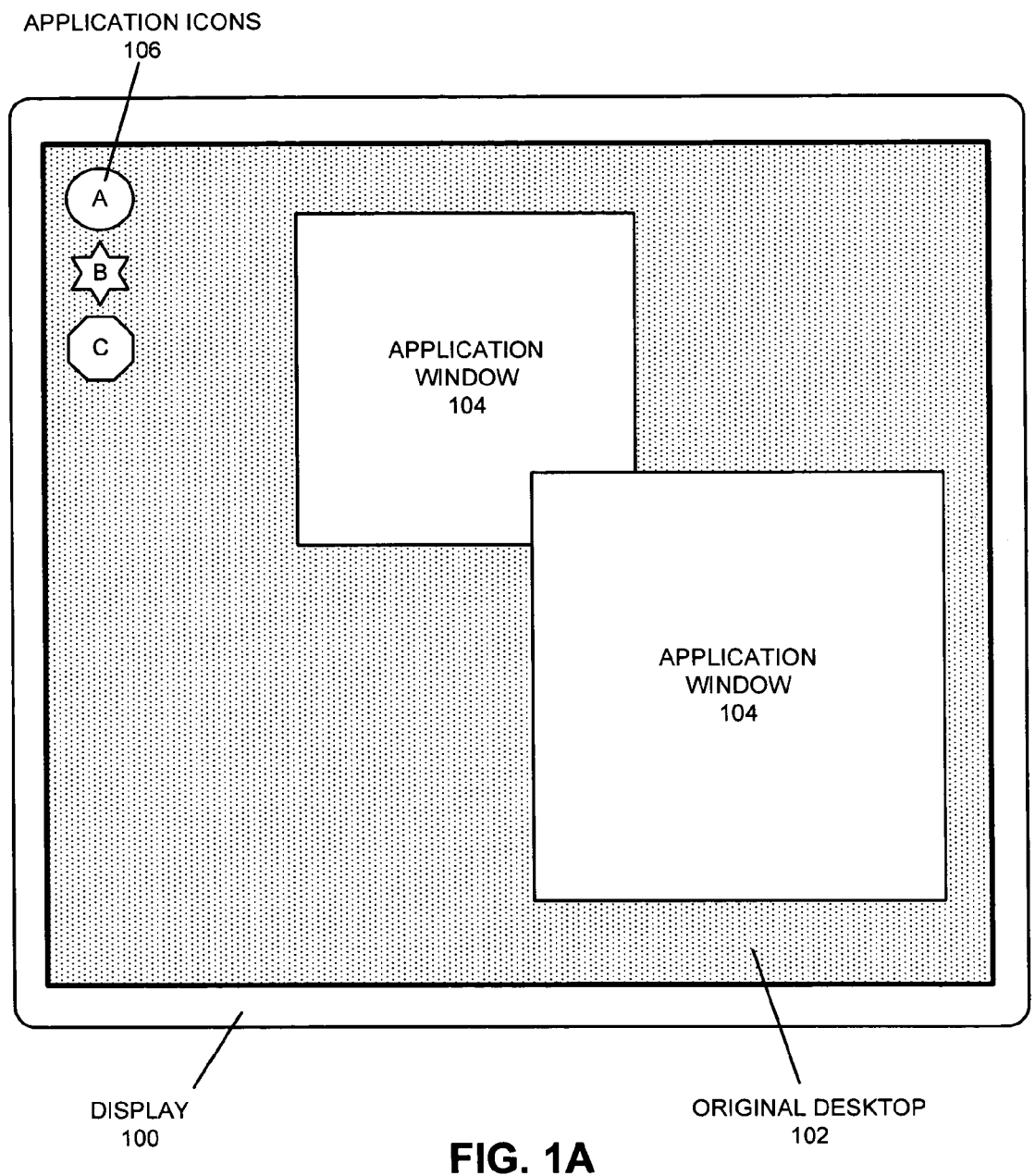
FIG. 1A illustrates a computer display presenting the image of a computer desktop to a user in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Application Management

The limited screen sizes of computers and other devices have been driving developers to design application user-interface (UI) representations which enable users to easily reach, invoke, and use applications. Existing UI approaches, such as cascading menus, folders, auto-hide taskbars, and virtual desktops attempt to provide such ease-of-use, but suffer from significant limitations.

Cascading menus are widely-used to organize UI representations of applications, especially launch icons. However, cascading menus suffer from various drawbacks. When many items are put into a cascading menu, the menu becomes large and can obscure large portions of the screen. Hierarchically organizing the items in a cascading menu can reduce space consumption, but requires additional user selection operations to browse through the hierarchical items. Furthermore, cascading menus have not been used to display thumbnails of running applications or representations of windows of running applications. Finally, existing cascading windows systems do not facilitate acting on a set of task-related applications simultaneously.

Folders can also be used to group related applications, but suffer from similar problems as cascading menus, such as obscuring the screen, requiring additional input operations, and not providing a way to act on a set of task-related applications.

Another UI technique, auto-hide taskbars, provides a way for users to keep UI representations of applications, such as launch icons and icons representing running applications, easily reachable without obscuring the screen when they are not actively used. However, when many items are added to the taskbar, such taskbars also become large and tend to obscure the screen when opened.

Virtual desktops provide a way for users to organize applications such that related applications share the same virtual desktop screen. However, switching between desktops results in a large context change as visuals and the available applications on the screen change, which can be troublesome or confusing for a user. For the same reason, mixing two or more tasks simultaneously across virtual desktops can result in context changes that are difficult and/or confusing.

One embodiment of the present invention leverages advances in graphics capabilities to create a zooming effect that provides additional display space for managing applications. This technique maintains the context of the current computer desktop while also providing the user with this additional display space. Note that this technique does not obscure the computer desktop, and does not involve many additional input operations. This technique can also host representations of running applications and supports actions upon task-related applications.

Providing an Extended Display Area for Application Management

While several existing approaches use three-dimensional (3D) space to navigate and zoom in a desktop environment, these approaches typically allow so much freedom of movement that users have difficulty with navigation. Furthermore, such techniques typically suffer from one or more of the same problems found in the UI techniques mentioned previously, such as obscuring the desktop, requiring additional input operations, and not supporting task-oriented grouping of applications. For instance, 3D car-racing and flight-simulator games typically support switching between a zoomed-in and zoomed-out view, but only in the context of the game, and without any consideration of application and task management.

One embodiment of the present invention provides a way for the user to zoom out from the current desktop view shown on a display. Decreasing the size of the computer desktop in the display area provides an extended display area around the current desktop that can be used for a wide variety of UI representations of applications and other items. The user can then access these items easily and efficiently without losing the context of the computer desktop.

FIG. 1A illustrates a computer display 100 presenting the image of a computer desktop to a user. The computer desktop 102 shown includes several application windows 104 as well as a set of application icons 106 that might be used to launch associated applications.

Figure 1B:
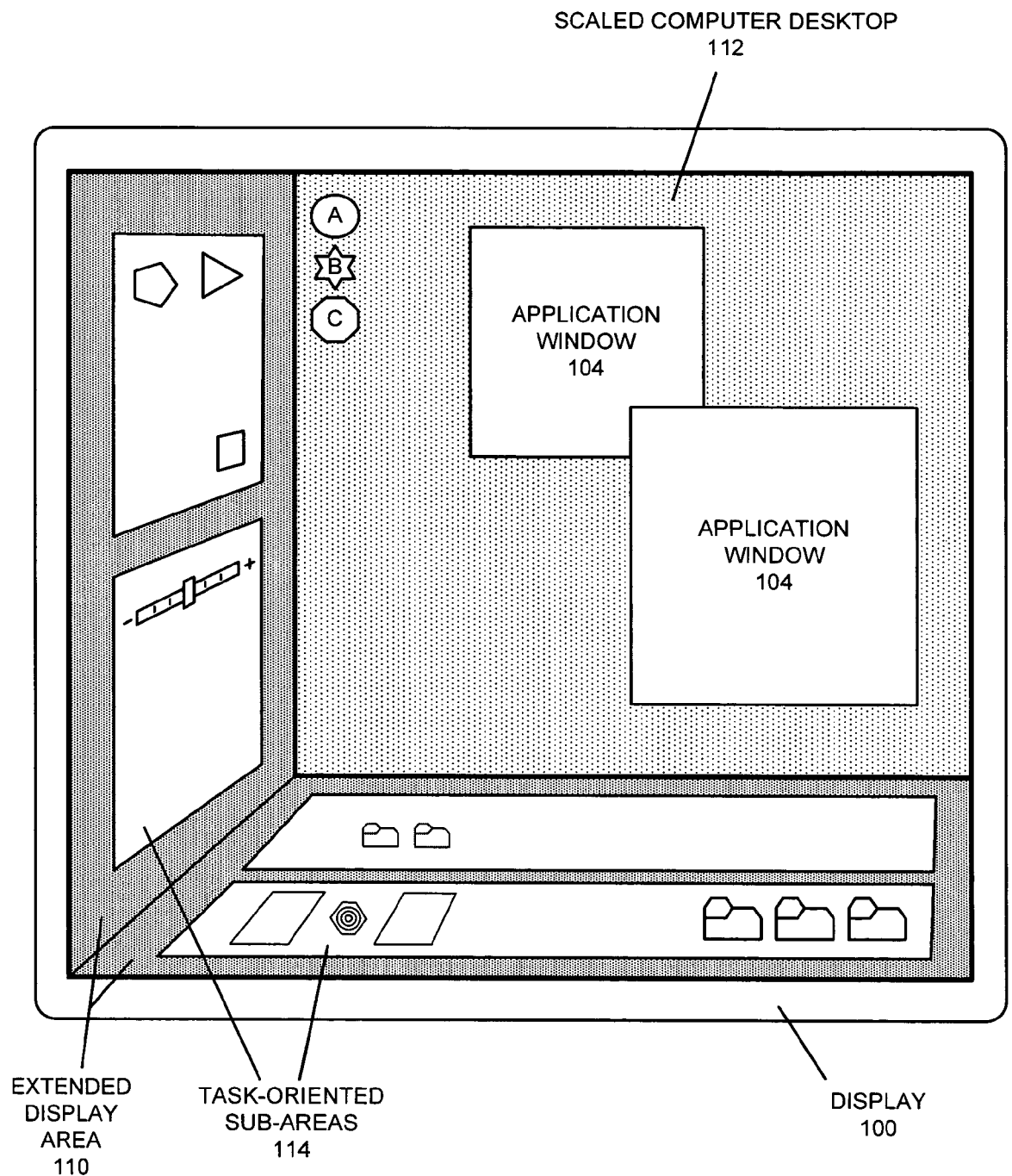
FIG. 1B illustrates a computer display after a zooming effect in accordance with an embodiment of the present invention.

FIG. 1B illustrates the computer display after the system has completed a zooming effect.

Figure 2:
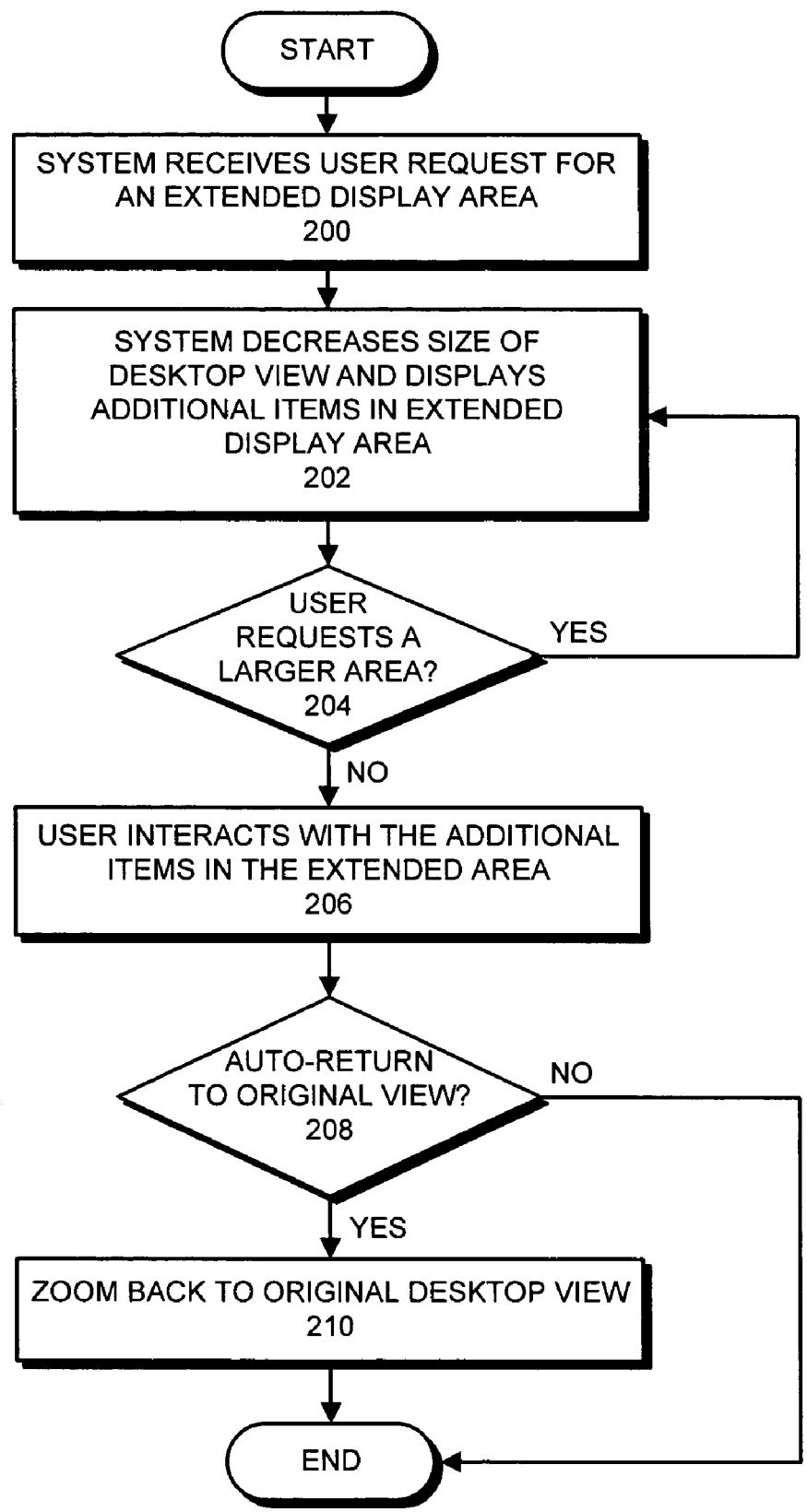
FIG. 2 presents a flow chart illustrating the process of using a zooming effect to provide additional display space in accordance with an embodiment of the present invention.

FIG. 2 presents a flow chart illustrating the process of using the zooming effect to provide additional display space for application management. First, the system receives a user request for an extended display area 110 (step 200), for instance via a button press, key sequence, or mouse gesture. In response, the system decreases the size of the desktop view and displays additional items in an extended display area 110 available as a result of the resized desktop view (step 202). In one embodiment of the present invention, if the system receives a request from the user to display a larger extended display area (step 204), the system can further decrease the size of the desktop view to provide a larger extended display area. After determining a desired size for the extended display area 110, the user can proceed to interact with the additional items in the extended display area 110 (step 206) or the objects in the scaled computer desktop 112.

Note that the system may be configured to switch among a set of predefined degrees of zooming using a simple stimulus, such as a key combination or mouse gesture. Such predefined degrees can include a full-screen view of the computer desktop as well as narrow, medium-sized, and/or large views of the extended display area. Such predefined degrees of zooming allow users to change the size of the extended display area without complex 3D navigation. Depending upon the size of the extended display area, the system may display a range of items. If the extended display area is small, the system may display only a small set of commonly-used items. On the other hand, if a larger extended display area is available, the system may display a larger set of items that includes both commonly-used items as well as less-commonly-used items. A user can trade-off the size of the computer desktop and the extended display area on a per-task basis. For instance, if a task involves substantial interaction with files and application invocation, the user may choose to keep an extended display area with relevant sub-areas open persistently.

In one embodiment of the present invention, the system can be configured to automatically return (step 208) the scaled computer desktop 112 to the original size (step 210), e.g. after a certain time interval or a user selection. Alternatively, the system may leave the extended display area 110 visible until the system receives a user request to return to the original desktop view.

In one embodiment of the present invention, the system does not allow applications in the desktop area to impinge on the extended display area 110, thereby preventing the UI representations in the extended display area 110 from being obscured.

In one embodiment of the present invention, the system divides the extended display area 110 into task-oriented sub-areas 114. Each sub-area may include different modal properties or behavior, and the system can display items in these sub-areas using identifying characteristics such as tags, colors, borders, viewing angles, and textures.

The extended display area 110 and these task-oriented sub-areas 114 can display items such as:
representations of currently-running applications;
iconized views of applications;
shortcuts used to launch applications;
files;
folders;
documents;
user interface elements of an application that involves multiple user interface elements;
iconized user interface elements of an application that involves multiple user interface elements;
file and/or application menus;
user-defined groupings of regularly-used or functionally-similar applications or files; and/or
user interface elements that control the configuration, status, and/or parameters of software entities and/or computing devices, such as applications, windowing systems, operating systems, and/or connected devices and computers.

In a further embodiment, a control in the extended display area 110 may be used to control the display size of the scaled computer desktop 112 or other parameters involving the extended display area 110. For instance, a gesture-based input mechanism may be used to map gestures that act upon the extended display area 110.

In a further embodiment, the user can customize both the items placed in each sub-area as well as the identifying characteristics of the items and the sub-areas. For instance, a user might configure a sub-area as a gathering point for a set of internet applications, or as a common area for a set of related files. The system allows users to drag and drop items among the sub-areas and the desktop. For instance, a user can drag a UI representation of an application between sub-areas, or drag a mini-view of a currently-running application from the desktop to a sub-area for monitoring.

In a further embodiment, the system allows a user to perform a set of task-oriented actions upon all of the applications in a task-oriented sub-area 114. For instance, a task-oriented sub-area 114 may include buttons that, when pressed, activate sets of actions, such as: opening all of the applications belonging to the task-oriented sub-area 114; iconizing all the applications associated with the task-oriented sub-area 114; moving all of the launch icons in the task-oriented sub-area 114 into the scaled computer desktop 112; and/or moving the launch icons associated with the task-oriented sub-area 114 from the scaled computer desktop 114 back into the task-oriented sub-area 114.

In one embodiment of the present invention, the system decreases the size of the computer desktop by changing a three-dimensional model or camera view/position. Alternatively, the system can scale the desktop by interpolating the pixels for the computer desktop.

Figure 3:
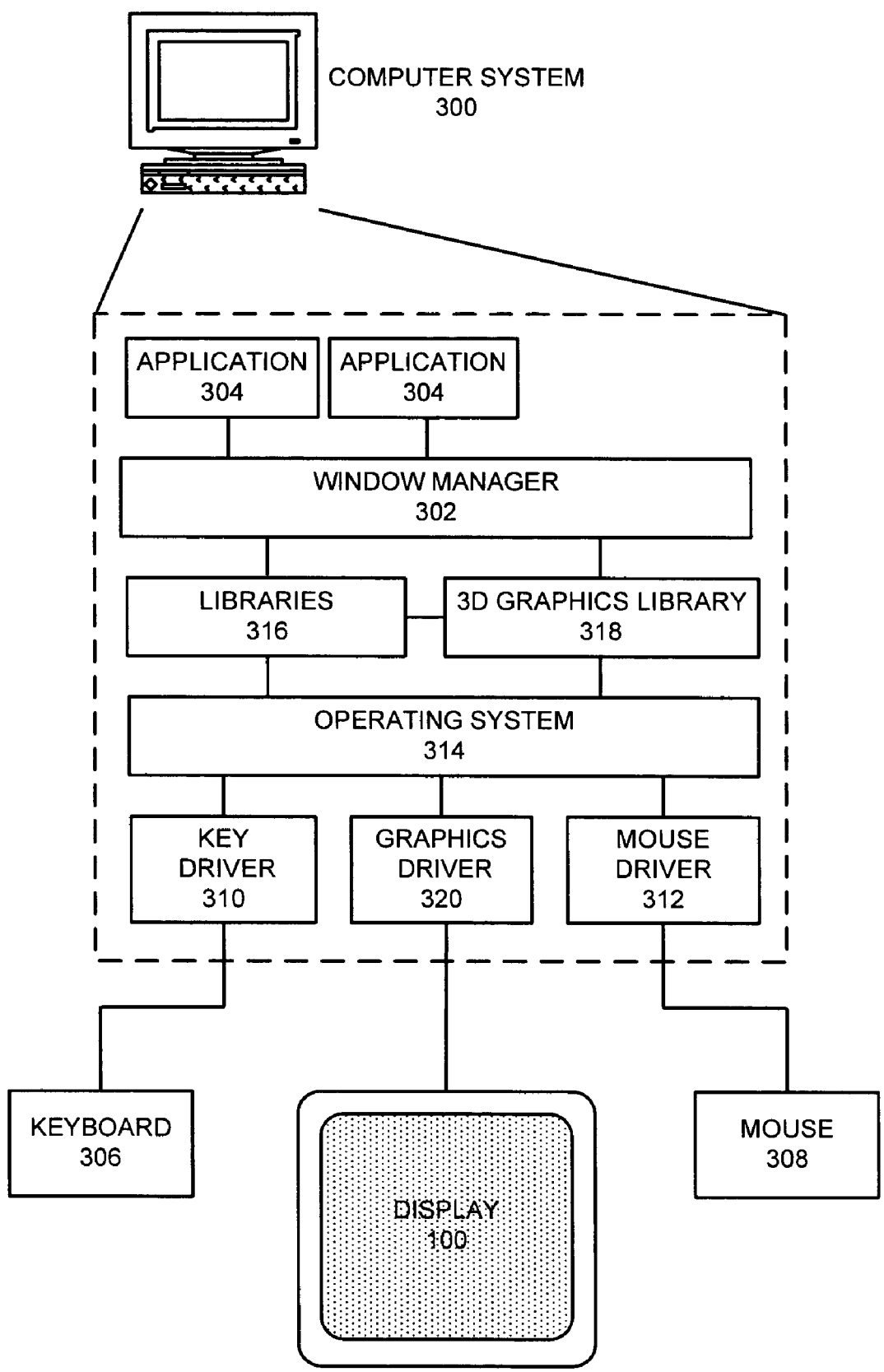
FIG. 3 illustrates a computer system that supports a zooming effect in accordance with an embodiment of the present invention.

FIG. 3 illustrates the components of a computer system 300 that supports a zooming effect. Such a zooming effect can be supported by various software mechanisms, including computer software that includes a user interface, one or more graphical user interface libraries, a windowing system, and/or an operating system. In one embodiment of the present invention, a window manager 302 or a substantially similar application that manages the screen space handles the zooming effect. Typically, the window manager 302 allocates screen space to applications 304 and provides mechanisms that allow users to start applications and/or access running applications. During operation, when the computer system receives an input from a device such as a keyboard 306 or mouse 308, the operating system 314 receives notice from a corresponding key driver 310 or mouse driver 312. The operating system 314 passes notice of the input up to the window manager 302 via a set of software libraries 316. The window manager 302 determines the proper response, such as a zooming effect and the creation of an extended display area, and sends instructions to a 3D graphics library 318, which in turn sends a set of display instructions to the display 100 via the operating system 314 and a graphics driver 320.

In one embodiment of the present invention, the system decreases the size of the computer desktop to create an effect of shrinking the desktop back into the screen, thereby leaving the extended display area available for the display of additional items. In FIG. 1B, the scaled computer desktop 112 shrinks into the upper right-hand corner, leaving an extended display area 110 on the bottom and left side of the display.

Figure 4:
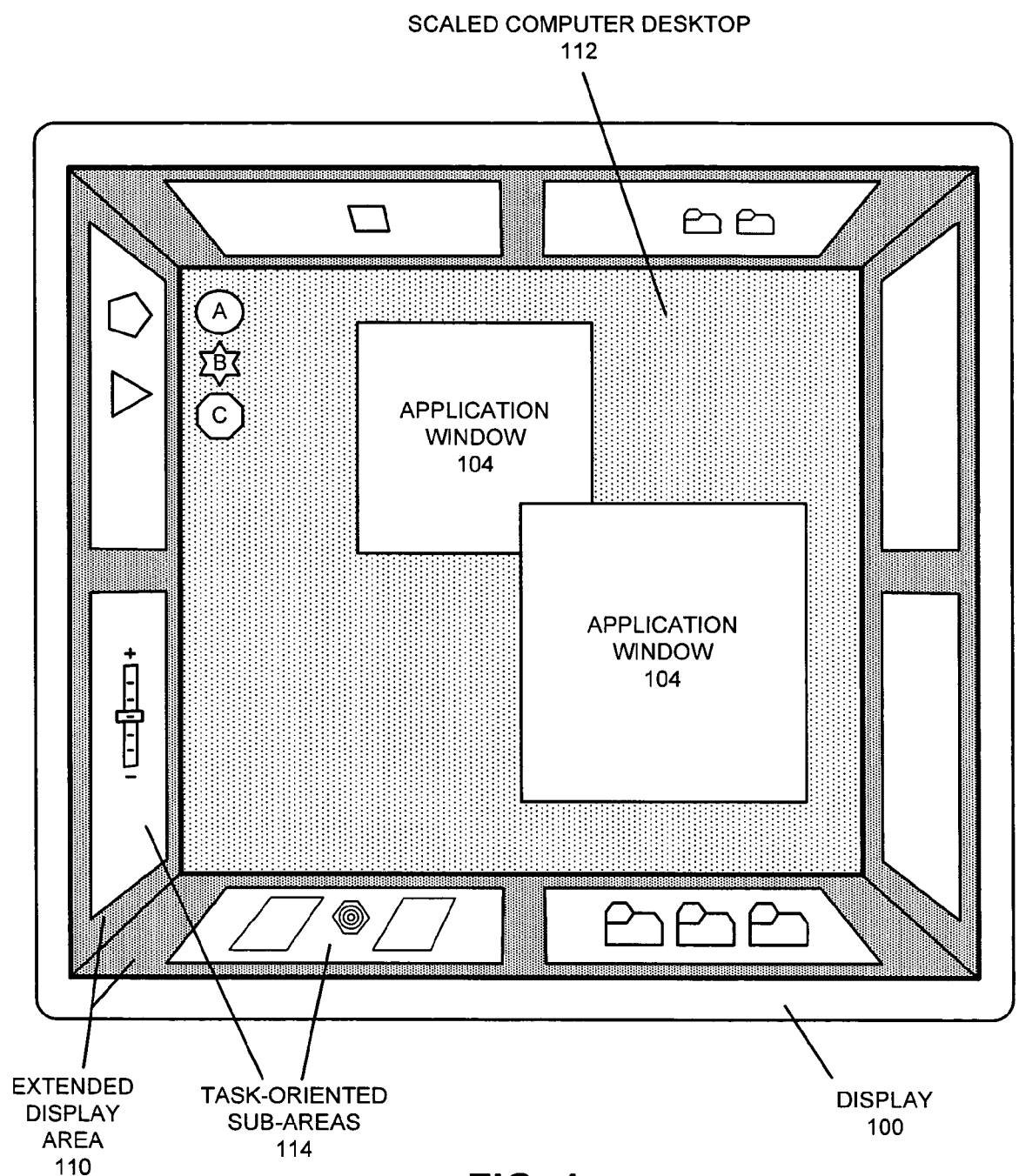
FIG. 4 illustrates a second type of zooming effect in accordance with an embodiment of the present invention.

FIG. 4 illustrates another variation of the zoom effect in which the scaled computer desktop 112 shrinks into the center of the screen, hence leaving an extended display space on all four edges of the display. The system can also shrink the desktop to any edge of the screen, thereby leaving an extended display space on the other three edges of the display.

Figure 5:
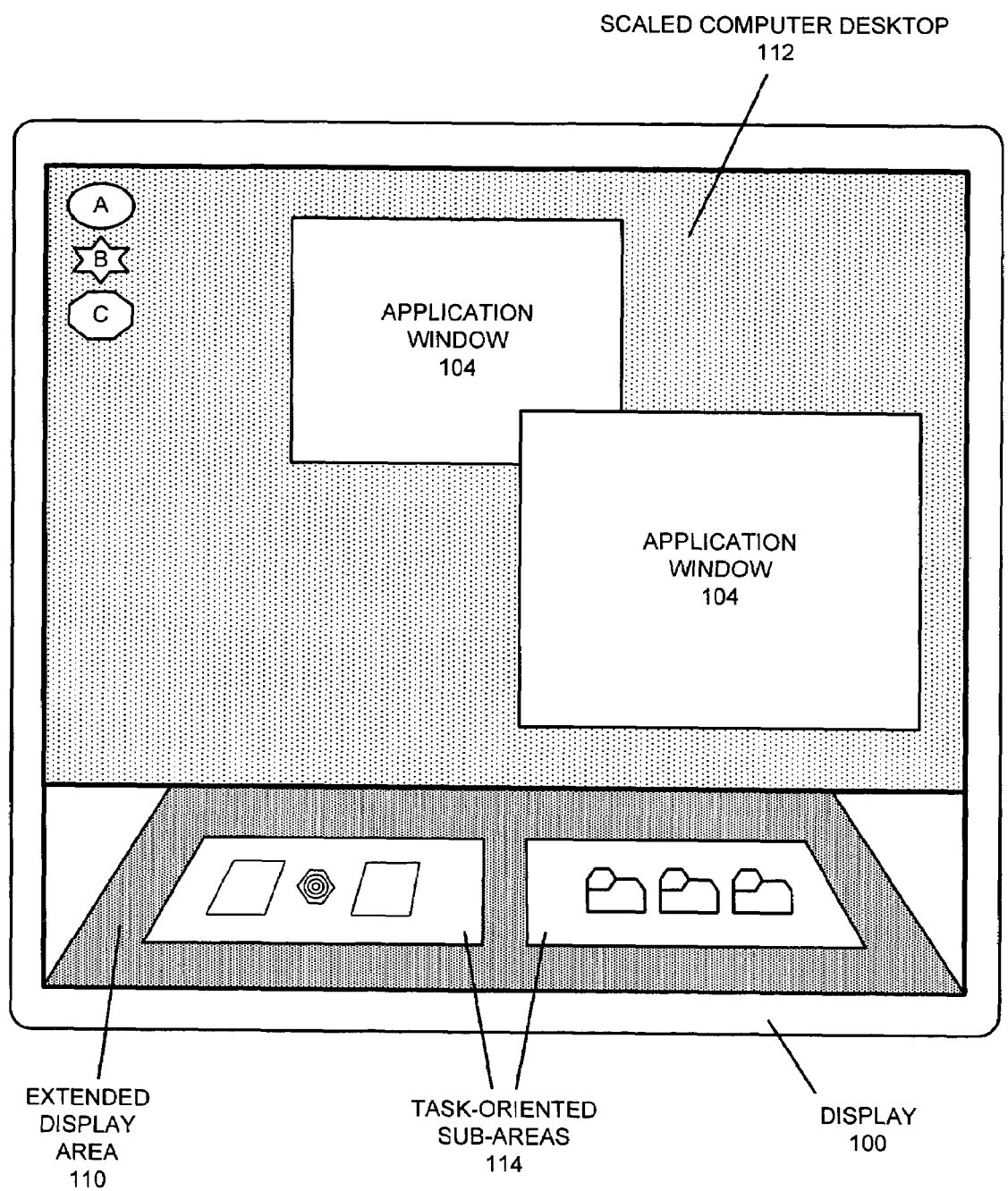
FIG. 5 illustrates a third type of zooming effect in accordance with an embodiment of the present invention.

FIG. 5 illustrates a desktop scaling effect in which the system scales the computer desktop by decreasing the desktop size in only one dimension (in this case, squashing the desktop in the y-axis).

Figure 6:
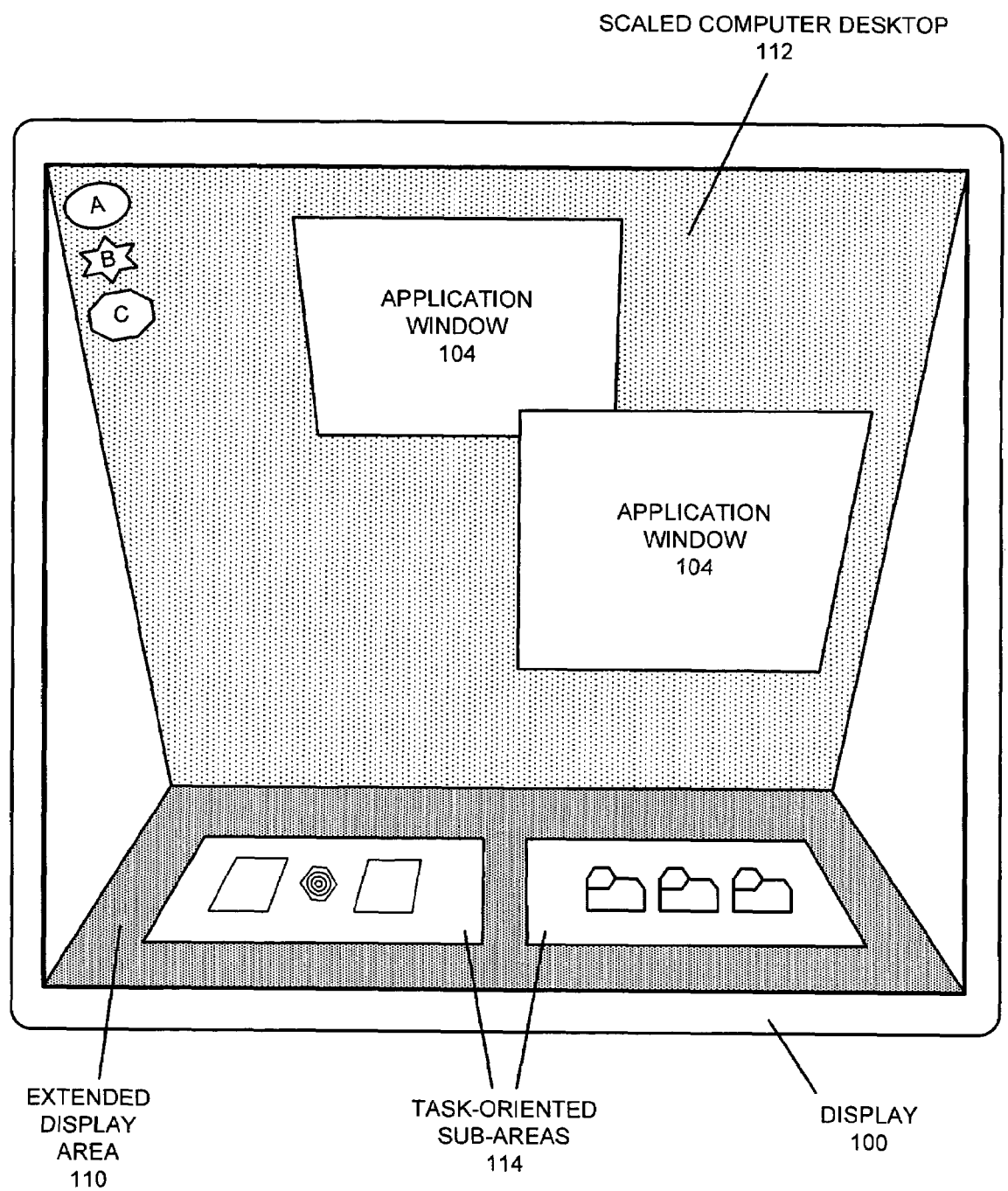
FIG. 6 illustrates a fourth type of zooming effect in accordance with an embodiment of the present invention.

FIG. 6 illustrates a desktop scaling effect in which the system changes the aspect ratio and uses perspective when scaling the computer desktop. Note that the system can combine multiple zooming and scaling effects, if desired. One embodiment of the present invention uses such scaling and zooming effects to provide a metaphor of a work area with a desktop and wall holding items and a work area that includes running applications.

The techniques described in the above embodiments of the present invention can also be used in conjunction with the existing display and selection techniques mentioned in the previous section. For instance, taskbars, cascading menus, folders, and virtual desktops can all still be used in the resized desktop area, with the system scaling them down in size along with the rest of the desktop. In addition, in one embodiment of the present invention, the system may incorporate such zooming and scaling effects to enhance these techniques, for instance by using such effects to maintain context when switching between virtual desktops.

In summary, one embodiment of the present invention leverages zooming and scaling effects enabled by advances in graphics capabilities to provide additional display space for application management. By using such effects, the system provides an improved selection mechanism with an adjustable, extended display area from which users can make selections. This extended display area is not obscured by applications on the desktop, can host representations of running applications, does not involve many additional input operations in the selection process, and supports actions upon task-related applications.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for using a zooming effect to provide additional display space for application management, wherein the computer includes a processor, the method comprising:
   receiving a request from a user to provide additional display space in a display device for application management, wherein a display device presents an image of a computer desktop to the user; and
   in response to the request,
      decreasing the size of the computer desktop in the display device
   to provide an extended display area,
      displaying an item in the extended display; and
      displaying a user interface element in the extended display area, wherein by adjusting the user interface element in the extended display area, a user either zooms in to increase the display area of the desktop or zooms out to decrease the display area of the desktop, wherein increasing the display area of the desktop involves proportionally reducing the area of the extended display area and decreasing the display area of the desktop involves proportionally reducing the area of the extended display area.

2. The method of claim 1,
   wherein the extended display area appears in proximity to the edge of the screen; and
   wherein the method involves using transition animation as part of the zooming effect.

3. The method of claim 2, wherein decreasing the size of the computer desktop and transitioning to displaying the extended display area involves a three-dimensional view change and/or a simulated three-dimensional view change that maintains the spatial sense of the user.

4. The method of claim 3, wherein using a three-dimensional view change and providing the extended display area in proximity to the edge of the screen allows the user to continue interacting with items displayed in the computer desktop.

5. The method of claim 4, wherein the extended display area and the computer desktop facilitate displaying a metaphor of a work area with a top of a desk and a wall that hold items along with a work space that displays active applications and other items.

6. The method of claim 1, wherein the item can include:
   a representation of a currently-running application, wherein the representation of the currently-running application was dragged by a user from the desktop to an extended display area, and wherein the view of the currently-running application in the extended display area is a miniaturized view;
   an iconized view of an application;
   a shortcut used to launch an application;
   a file;
   a folder;
   a document;
   a user interface element of an application that involves multiple user interface elements;
   an iconized user interface element of an application that involves multiple user interface elements;
   a file and/or application menu;
   a user-defined grouping of regularly-used or functionally-similar applications or files; or
   a user interface element that controls the configuration, status, and/or parameters of software entities and/or computing devices.

7. The method of claim 1, wherein decreasing the size of the computer desktop further involves:
   providing the user with a choice of different sizes for the extended display area; and
   receiving a selection from the user that corresponds to a desired size for the extended display area.

8. The method of claim 1,
   wherein receiving the request further involves receiving a request to switch among a set of predefined degrees of zooming using a simple stimulus;
   wherein the set of predefined degrees includes a full-screen view of the computer desktop as well as narrow, medium-sized, and/or large views of the extended display area.

9. The method of claim 1, wherein displaying an item in the extended display area involves displaying the extended display area distinctly and separately from the computer desktop, so that objects displayed on the computer desktop cannot obscure the extended display area.

10. The method of claim 7, wherein displaying an item in the extended display area involves:

dividing the extended display area into sub-areas; and
wherein each sub-area may include different modal properties or behavior.

11. The method of claim 10,
wherein items in a sub-area of the extended display area are displayed using identifying characteristics including tags, colors, borders, and textures; and
wherein the method further comprises allowing a user to customize which items are placed in the sub-area as well as the identifying characteristics of the items in the sub-area.

12. The method of claim 11,
wherein a small extended display area displays a set of commonly-used items; and
wherein a larger extended display area displays a larger set of items that includes both commonly-used items and less-commonly-used items.

13. The method of claim 1, wherein decreasing the size of the computer desktop involves:
changing a three-dimensional model or camera view of the computer desktop; or
interpolating the pixels of the computer desktop.

14. A computer-readable storage medium storing instructions that when executed by a computer cause the computer to perform a method for using a zooming effect to provide additional display space for application management, the method comprising:
receiving a request from a user to provide additional display space in a display device for application management, wherein a display device presents an image of a computer desktop to the user; and
in response to the request,
decreasing the size of the computer desktop in the display device to provide an extended display area,
displaying an item in the extended display area; and
displaying a user interface element in the extended display area, wherein by adjusting the user interface element in the extended display area, a user either zooms in to increase the display area of the desktop or zooms out to decrease the display area of the desktop, wherein increasing the display area of the desktop involves proportionally reducing the area of the extended display area and decreasing the display area of the desktop involves proportionally reducing the area of the extended display area.

15. The computer-readable storage medium of claim 14, wherein the item can include:
a representation of a currently-running application, wherein the representation of the currently-running application was dragged by a user from the desktop to an extended display area, and wherein the view of the currently-running application in the extended display area is a miniaturized view;
an iconized view of an application;
a shortcut used to launch an application;
a file;
a folder;
a document;
a user interface element of an application that involves multiple user interface elements;
an iconized user interface element of an application that involves multiple user interface elements;
a file and/or application menu;
a user-defined grouping of regularly-used or functionally-similar applications or files; or
a user interface element that controls the configuration, status, and/or parameters of software entities and/or computing devices.

16. The computer-readable storage medium of claim 14, wherein decreasing the size of the computer desktop further involves:
providing the user with a choice of different sizes for the extended display area; and
receiving a selection from the user that corresponds to a desired size for the extended display area.

17. The computer-readable storage medium of claim 14, wherein displaying an item in the extended display area involves displaying the extended display area distinctly and separately from the computer desktop, so that objects displayed on the computer desktop cannot obscure the extended display area.

18. The computer-readable storage medium of claim 16, wherein displaying an item in the extended display area involves:
dividing the extended display area into sub-areas; and
wherein each sub-area may include different modal properties or behavior;
wherein items in a sub-area of the extended display area are displayed using identifying characteristics including tags, colors, borders, and textures; and
wherein the method further comprises allowing a user to customize which items are placed in the sub-area as well as the identifying characteristics of the items in the sub-area.

19. An apparatus that uses a zooming effect to provide additional display space for application management, comprising:
a receiving mechanism configured to receive a request from a user to provide additional display space in a display device for application management, wherein a display device presents an image of a computer desktop to the user; and
a display mechanism configured to, in response to the request:
decrease the size of the computer desktop in the display device to provide an extended display area,
display an item in the extended display area, and
wherein the display mechanism is further configured to display a user interface element in the extended display area, wherein by adjusting the user interface element in the extended display area, a user either zooms in to increase the display area of the desktop or zooms out to decrease the display area of the desktop, wherein increasing the display area of the desktop involves proportionally reducing the area of the extended display area and decreasing the display area of the desktop involves proportionally reducing the area of the extended display area.

* * * * *